United States Patent

McKinney et al.

Patent Number: 4,478,227
Date of Patent: Oct. 23, 1984

[54] LEAF STRIPPING MECHANISM

[76] Inventors: Charles W. McKinney, 363 Main St.; Brittain H. McKinney, Hogan Rd., both of Gordonsville, Tenn. 38563

[21] Appl. No.: 398,920

[22] Filed: Jul. 16, 1982

[51] Int. Cl.³ .............................................. A01D 45/16
[52] U.S. Cl. ................................ 130/30 R; 130/31 R; 56/27.5
[58] Field of Search .............. 56/27.5; 130/30 R, 31 R

[56] References Cited

U.S. PATENT DOCUMENTS

| | | | |
|---|---|---|---|
| 49557 | 8/1865 | Witherell | 130/31 R |
| 50350 | 10/1865 | Gladden et al. | 130/31 R |
| 853,511 | 5/1907 | Hall | 130/31 R |
| 1,518,349 | 12/1924 | Olson | 130/31 R |
| 2,467,052 | 4/1949 | Roberts | 130/31 R |
| 3,175,561 | 3/1965 | Oldershaw | 130/30 R |
| 4,292,982 | 10/1981 | Butcher | 56/27.5 |
| 4,373,323 | 2/1983 | Jones | 130/30 R |

*Primary Examiner*—Gene Mancene
*Assistant Examiner*—Kris R. Schulze

[57] ABSTRACT

A leaf stripper for tobacco stalks and the like wherein the leaves are removed from the stalks by the stalks being pulled or forced through a cooperating spring loaded scraper bars and a roughly eliptically shaped opening in a flat plate and wherein the leaves are held by the invention until removed by an operator, and wherein the opening can be easily manually opened to allow fast insertion of the stalks by the operator.

4 Claims, 3 Drawing Figures

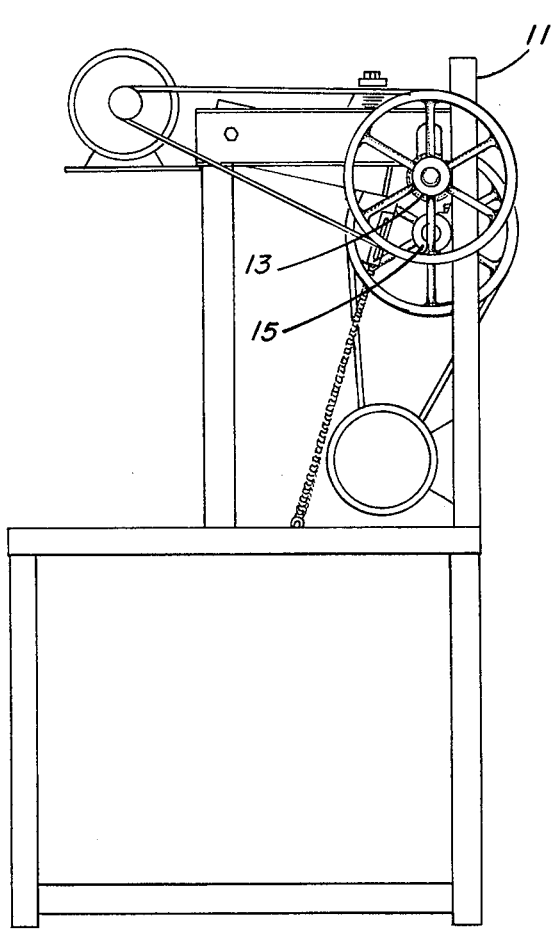
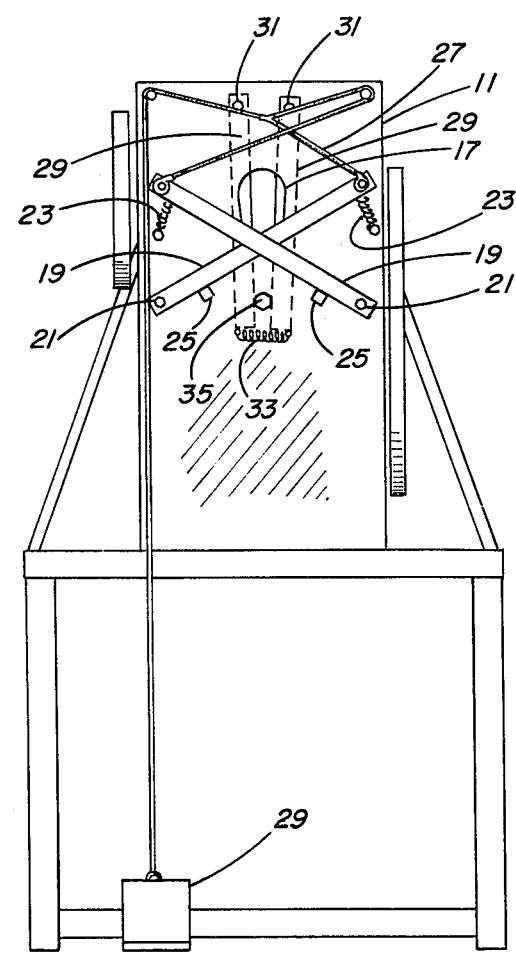
FIG. 2                    FIG. 3

LEAF STRIPPING MECHANISM

SUMMARY AND FIELD OF THE INVENTION

This invention relates generally to stripping leaves or other growth matter from stalks. Specifically, the invention relates to an improved method for scraper tobacco stripping machines.

DESCRIPTION OF PRIOR ART

The search of the prior art reveals only one apparatus for stripping the leaves from tobacco stalks where the tobacco stalk has been separated from the ground and dried; i.e. U.S. Pat. No. 4,292,982, but this apparatus uses devices to pull the leaves from the stalks with the resultant disadvantage that an excessive amount of the tobacco leaves are left on the stalk and thereby wasted.

There are in use today several strippers of the scraper type which usually use a variable opening to accommodate the varying diameter of a given stalk and different size stalks which is produced by sliding two spring loaded pieces of flat material with opposed, basically semicircular indentations in them at right angles to two other similarly spring loaded pieces of material. This method has the effect of producing a variable opening that maintains a roughly circular configuration. The top of the tobacco stalk is fed perpendicularly to the flat material into this opening first, and as the stalk emerges through the opening it engages some sort of pulling mechanism and by such mechanism is completely pulled through the opening. The spring loaded plates push perpendicularly against the stalk and the leaves are thereby scraped off. Such machines have at least three problems: (1) they can successfully accommodate only a given range of stalk diameter sizes without necessitating a change of scraper plates, (2) they are difficult to open with a pedal activated by the operator's foot in order to increase the size of the opening to allow faster feeding of the stalks, and (3) this particular configuration has a tendency to let at least some of the leaves fall away from the variable opening after they are stripped.

It is the objective of any stripping machine to strip the leaves from the stalks (1) as quickly as possible, (2) as cleanly and reliably as possible, (3) with as little labor as possible, and (4) be as simple, low cost and maintenance free as possible. Our invention achieves these objectives by using a face plate with a roughly elliptical shaped hole cut in it and four spring activated flat rectangular scraper blades attached to it, two of which can be easily pulled at angles to each other with a cord attached to a foot pedal to enlarge the stripping opening and allow fast insertion of the stalk. The particular angles at which these scraper blades are set with respect to each other provide almost complete holding of the leaves at the stripping opening to allow one man operation of the machine, orientation of the leaves in a relatively straight configuration with respect to each other, and coarse "grading" of the leaves.

DESCRIPTION OF DRAWINGS

FIG. 2 is a side drawing of a complete stripping machine showing the invention in its position with respect to the puller rollers.

FIG. 3 is a drawing of the invention showing the configuration of the scraper bars.

DETAILED DESCRIPTION OF THE INVENTION

Figure 1:
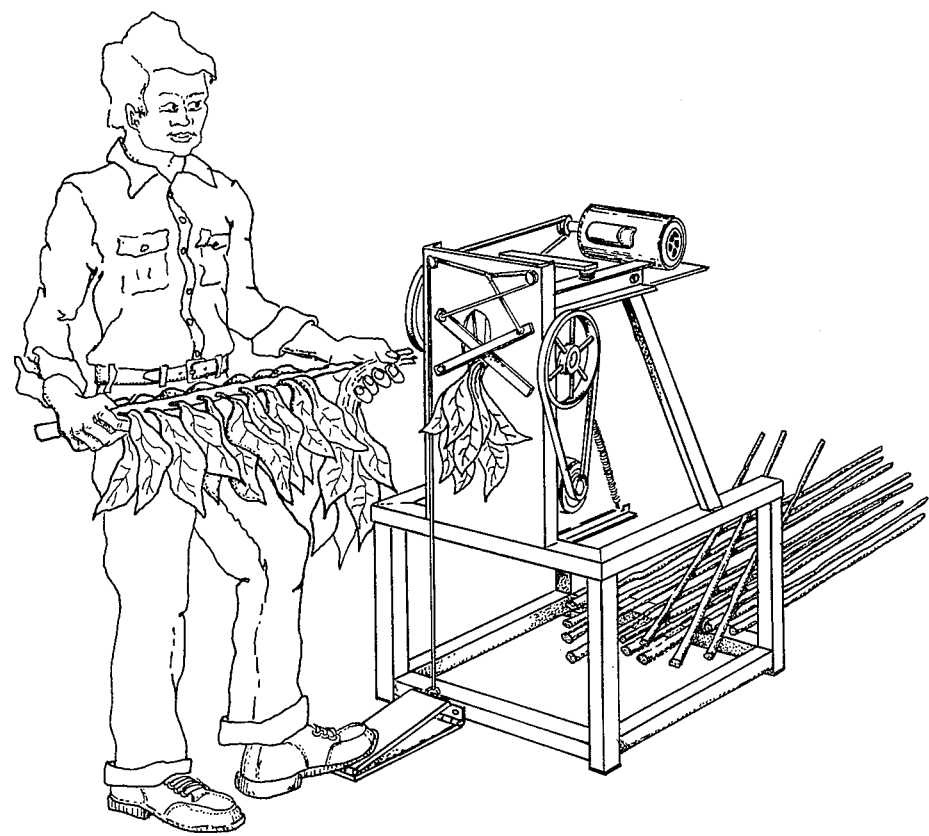
FIG. 1 is an overall view of the invention in a complete stripping machine.

Tobacco leaves grow on stalks at acute angles to the stalk with respect to the top of the stalks. The leaves are the product sold by tobacco growers and the stalks are virtually a waste product. In some forms of tobacco, the leaves are harvested by severing the entire stalk from the ground, while the leaves are "green", drying them by one means or another, and then after they are dry, separating them by hand or mechanically from the stalk. The leaves have different "grades" (color and texture) depending on their position on the stalk. The stalks on which the tobacco grows vary greatly in diameter from the top to the bottom of each stalk and also with respect to each other.

The machine (FIG. 2) in which the method of our invention is carried out consists of a faceplate (11) mounted just in front of two counterrotating puller rollers (13 and 15). These puller rollers are mechanically powered by some means, as shown on the preferred embodiment by two separate motors. These puller rollers must be of a serrated or other rough surface type to be able to exert a sufficient hold on the stalk to pull it through the stripping opening. Also one of the rollers must vertically move with respect to the other in order to accommodate the differing diameter of the stalks.

FIG. 3 is a front view of the machine, as viewed by the operator. A roughly elliptically shaped hole (17) is cut in the faceplate (11). Two scraper bars (19) are attached to the front of the faceplate upon loose pivots (21). These front scraper bars are attached at their other end to two tension springs (23) which when no external force is being applied by the operator via the foot pedal mechanism hold the front scraper bars in their closed position against two stops (25). Also attached to the front scraper bars at the same end as is attached to the springs is a flexible cord mechanism (27) connecting the front scraper bars to a foot pedal (29). As the foot pedal is depressed by the operator, the top ends of the scraper bars are pulled toward each other exposing the bottom portion of the elliptically shaped hole which then constitutes the "stripping hole" where the stalks are inserted. It is this ability of the machine to expose a large opening to the operator which gives the machine its ability to be fed stalks rapidly. As soon as the top end of the stalk is inserted through the faceplate the operator releases the foot pedal (29) and the springs (23) hold the scraper bars (19) against the stalk causing any leaves they come in contact with to be stripped from the stalk and remain on the front of the faceplate (11).

Located behind the roughly elliptically shaped hole (17) in a roughly vertical position are two rear scraper bars (29). These rear scraper bars are attached at their top ends to pivots (31) on the faceplate. The rear scraper bars are attached to each other at their lower end with a low tension spring. When in the closed position the rear scraper bars rest against a stop (35) which is wide enough to present an opening large enough to allow stalks to be fed easily yet narrow enough to come into contact with the sides of larger stalks. As a stalk is pulled through the stripping opening, the spring (33) holds the bars against the stalk when the stalk's diameter is larger than the width of the stop.

Both the front and rear set of scraper bars and the faceplate are constructed of material sufficiently thick to resist distortion by the stalks. The tension in the front scraper bar springs (23) is very light being only so much as is necessary to hold the front scraper bars (29) against the stalk to be stripped. In the configuration of the faceplate (11) and scraper bars (19 and 31) in this invention (i.e. they do not provide a complete approximation of the stalk's diameter) some of the leaves' stems emerge through the stripping opening and since the leaf becomes larger as the lamina of the leaf is encountered, these leaves are stripped off by the action of the scraper bars (19 and 31) and faceplate (11), on the combined stems and lamina of the leaf. The result is therefore that a number of leaves are stripped with their stems actually protruding through the stripping opening (17). Other leaves are stripped from the stalks at the point where their stems contact the already stripped leaves and are entangled with the leaves whose stems penetrated the stripper opening. The result is that vertually all the leaves are held by the action of the front scraper blades pressing the penetrated stems against the bottom of the faceplate opening (17) so that they do not fall away from the opening and can be easily removed by either the feeder operator or by another worker doing only that job. During this holding period, the leaves remain relatively straight and orderly allowing the leaves to be tied in traditional "hands" or placed in an orderly fashion in the newer "bales" or "sheets". Coarse "grading" can be accomplished since the leaves are aligned in the order in which they grew on the stalk.

We claim:

1. A tobacco stripper for removing leaves from a tobacco stalk comprising:
   a base;
   a plate having an elliptical opening attached to said base;
   crop pulling means rearward of said plate for pulling the tobacco stalks through said opening;
   means for varying the size of said opening, said size varying means comprising first and second scrapper bars pivotally attached at one of their ends to said plate on opposite sides of the opening, the bars intersecting at a point substantially along the vertical centerline of said opening;
   means for urging the ends opposite said attached ends of said scrapper bars relative to one another so as to move the point of intersection substantially along said centerline, thus varying the size of the opening so as to accommodate different size tobacco crops; the tobacco leavings being stripped by the intersecting bars along the region of the point of intersection and an edge of the elliptical opening.

2. A tobacco stripper as claimed in claim 1 wherein said size varying means further includes third and forth scrapper bars pivotally attached at one of their ends to said plate, said third and forth bars are vertically positioned adjacent to and on opposite sides of the elongated sides of the elliptical opening, and means for urging the ends of the third and forth bars opposite said attached ends together so as to bring the edges of said third and fourth bars within the opening thereby adjusting the width of the opening.

3. A tobacco stripper as claimed in claim 1 wherein said means for urging said ends opposite said attached ends comprises cable means attached to said ends opposite said attached ends, a plurality of pulleys attached to said plate, and a manual foot pedal, wherein said cable means are slidably attached to said pulleys and at one end thereof attached to said foot pedal whereby actuation of said foot pedal moves said ends opposite said attached ends relative to one another.

4. A tobacco stripper as claimed in claim 1 wherein said crop pulling means comprises counter rotating rollers and means for rotating said rollers.

* * * * *